(12) United States Patent
Surace et al.

(10) Patent No.: US 6,490,791 B1
(45) Date of Patent: Dec. 10, 2002

(54) METHOD FOR REPAIRING CRACKS IN A TURBINE BLADE ROOT TRAILING EDGE

(75) Inventors: Raymond C. Surace, Middletown, CT (US); Brian D. Merry, Andover, CT (US); Gregory M. Dolansky, Higganum, CT (US); Gregory E. Reinhardt, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 28 days.

(21) Appl. No.: 09/887,448

(22) Filed: Jun. 22, 2001

(51) Int. Cl.⁷ .................................................. B23P 15/00
(52) U.S. Cl. .................. 29/889.1; 29/889.7; 29/402.06; 29/402.18; 29/558
(58) Field of Search ................................ 29/889.1, 889, 29/889.7, 402.01, 402.03, 402.04, 402.05, 402.06, 402.18, 558; 409/131

(56) References Cited

U.S. PATENT DOCUMENTS 5,584,662 A * 12/1996 Mannava et al. ........... 148/903
5,735,044 A * 4/1998 Ferrigno et al. ............ 29/889.1
5,806,751 A * 9/1998 Schaefer et al. ............ 228/119
6,283,356 B1 * 9/2001 Messelling ................. 164/92.1
6,302,625 B1 * 10/2001 Carey et al. ............. 29/402.19
6,434,823 B1 * 8/2002 Gupta et al. ............. 29/402.18

* cited by examiner

*Primary Examiner*—I Cuda Rosenbaum
(74) *Attorney, Agent, or Firm*—Bachman & LaPointe, P.C.

(57) ABSTRACT

A method for repairing a turbine blade having a crack in a trailing edge portion of the blade includes the steps of cutting back a first surface of the turbine blade adjacent the blade trailing edge portion where the crack is located, and cutting back a second surface of the turbine blade adjacent the blade trailing edge portion where the crack is located. Each cut back step comprises cutting back the respective surface by a depth greater than the length of the crack and less than the trailing edge radius to remove the crack and form a cut back trailing edge portion. A compound radius is used to prevent a blunt transition into the trailing edge that would result in aerodynamic losses and to reduce the airfoil root stresses. The method also includes applying a thermal barrier coating to the turbine blade to increase service life. Prior to applying the coating, the tip portion of the turbine blade is modified to account for the change in the thermal characteristics of the turbine blade.

16 Claims, 4 Drawing Sheets

METHOD FOR REPAIRING CRACKS IN A TURBINE BLADE ROOT TRAILING EDGE

BACKGROUND OF THE INVENTION

The present invention relates to a method for repairing cracks in a trailing edge portion of a turbine blade.

Axial cracks initiating at the root trailing edge cooling hole occur on turbine blades used in industrial applications. The cracks are caused by thermal mechanical fatigue. Typically, the cracks initiate from both the concave and the convex side of the root trailing edge cooling hole and run axially towards the leading edge of the blade. Since the turbine blades are otherwise serviceable, a method for effectively repairing these cracks is needed.

SUMMARY OF THE INVENTION

Accordingly, it is an object of the present invention to provide a method for repairing cracks in a trailing edge portion of a turbine blade.

It is a further object of the present invention to provide a repair method as above which has particular utility in the repair of cracks initiating at a root trailing edge cooling hole.

It is yet a further object of the present invention to provide a method as above which increases the service life of the repaired turbine blade.

The foregoing objects are attained by the method of the present invention.

In accordance with the present invention, a method for repairing a turbine blade having a crack in a trailing edge portion of the turbine blade is provided. The method broadly comprises cutting back the trailing edge portion of the concave and convex surfaces adjoining the trailing edge portion to a depth greater than the length of the crack. Concurrent with the cut back procedure, the portion of the turbine blade between the platform and the cut back trailing edge portion is shaped using a compound radius to eliminate the presence of any cusp on the trailing edge. Further, those edges remaining after the cut back procedure are blended to a smooth radius to minimize stress concentration and aerodynamic losses. The cut back trailing edge portion is also faired into the original trailing edge profile, preferably at the approximate mid-span, to minimize aerodynamic impact.

In accordance with the present invention, a thermal barrier coat is applied to the repaired turbine blade to increase its service life. Prior to the application of the thermal barrier coating, the tip length of the turbine blade is modified to account for reduced substrate temperature of the repaired turbine blade.

Other details of the repair method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
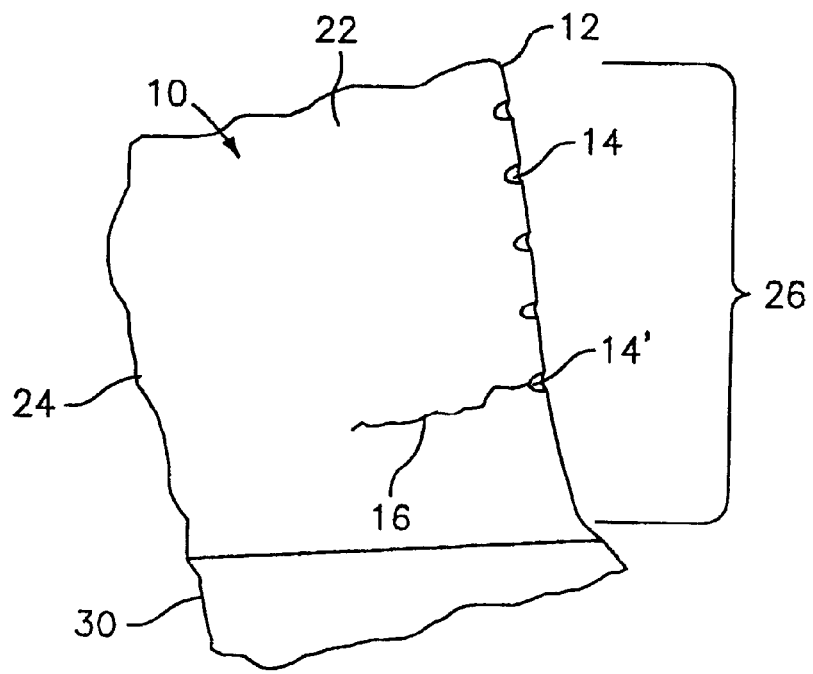
FIG. 1 is a perspective view of a root portion of a turbine blade to be repaired.

Referring now to the drawings, FIG. 1 shows a portion of a turbine blade 10 that requires repair. As can be seen from the figure, the trailing edge 12 of the turbine blade 10 is provided with a plurality of cooling holes 14. In service, one or more cracks 16 form in the vicinity of the lowermost one 14' of the cooling holes 14 known as the root trailing edge cooling hole. Typically, the cracks initiate from both the concave side 18 and the convex side 20 of the airfoil portion 22 of the turbine blade 10. Each crack 16 extends axially toward the leading edge 24 of the blade 10. It has been found that the cracks 16, that fall within acceptable serviceable limits, preferably that extend less than approximately about 0.05 inches and as determined for a given blade, may be repaired using the method of the present invention.

Figure 2:
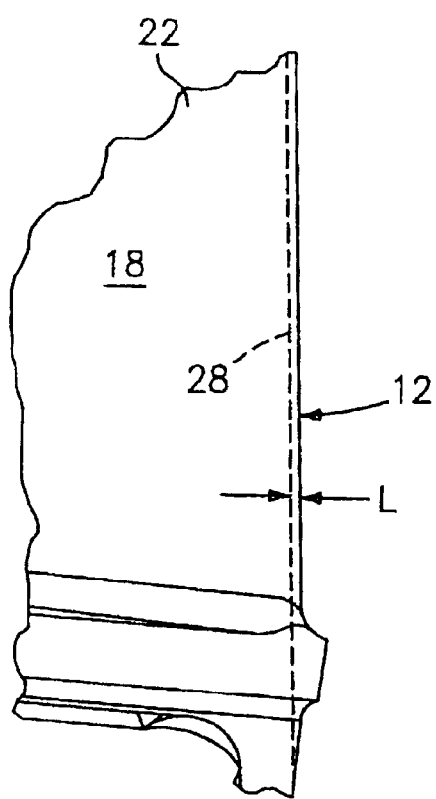
FIG. 2 is a side view of the root trailing edge portion on the concave airfoil side of the turbine blade.
Figure 3:
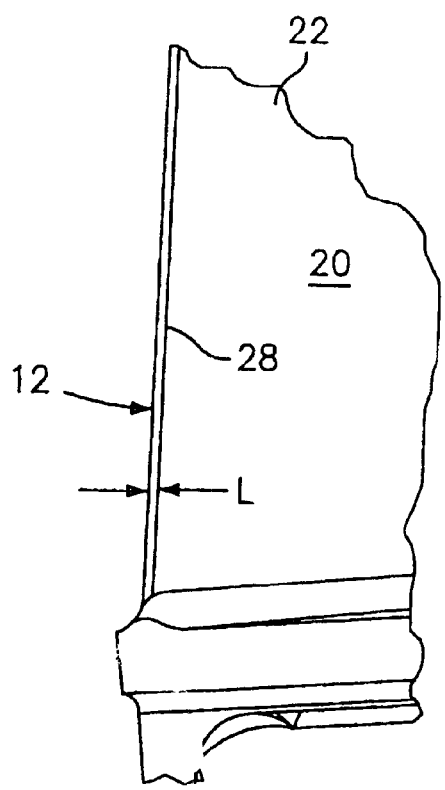
FIG. 3 is a side view of the root trailing edge portion on the convex airfoil side of the turbine blade.

To repair the cracks 16, a portion 26 of the trailing edge known as the root trailing edge portion is cut back on both the concave side 18 and the convex side 20. This cut back is shown in FIGS. 2 and 3. As can be seen in each of these figures, the original trailing edge 12 is cut back by a distance or depth L to form a cut back trailing edge portion 28. In a preferred embodiment of the present invention, the distance or depth L is greater than the length of the crack 16. This cut back removes material in the area where the crack 16 is located and reach fresh material where there are no cracks or microcracks. The distance or depth L is preferably less than the radius of the trailing edge 12.

The cutting back of the root trailing edge portion 26 may be carried out using any suitable means known in the art. Preferably, it is carried out by grinding or milling each of the concave side 18 and the convex side 20.

Figure 4:
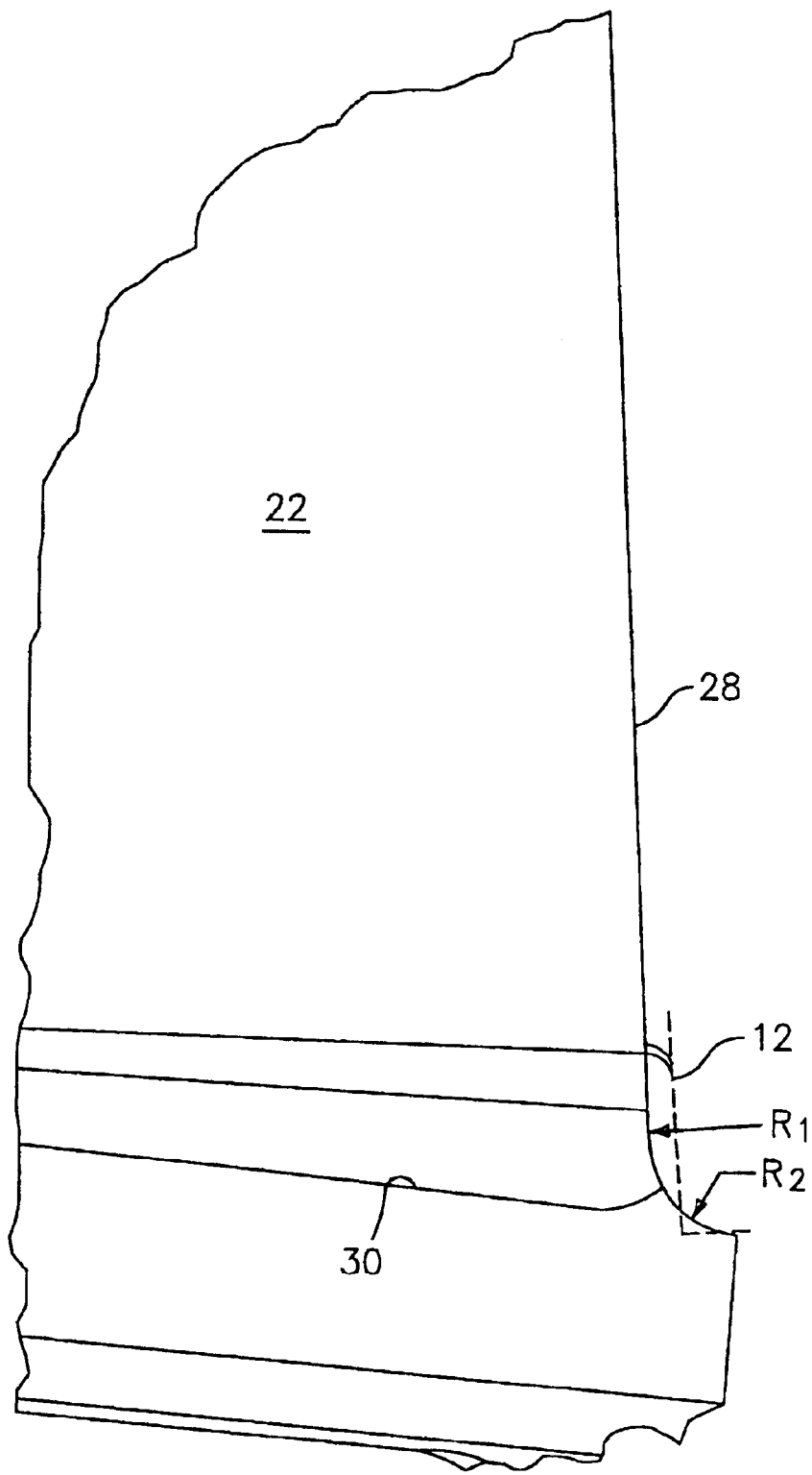
FIG. 4 is a side vide of the root trailing edge portion of the turbine blade showing the compound radius curve used to blend the cut back trailing edge portion to the platform portion of the turbine blade.

Concurrent with the cut back of each of the sides 18 and 20, it is necessary to blend the cut back trailing edge portion 28 into the platform 30 on the turbine blade. The blending must be carried out so that there is a smooth transition between the cut back trailing edge portion 28 and the platform 30. A unique feature of this invention is the use of a compound radius approach to achieve this smooth transition. The compound radius provides a large radius in the high stress location, while rapidly transitioning into the existing platform profile. The rapid transition eliminates a large trailing edge 12 blunt area which would increase aerodynamic losses. As can be seen in FIG. 4, a compound radius having a major radius $R_1$ and a minor radius $R_2$, which compound radius preferably varies from approximately about 0.375 inches to approximately about 0.1875 inches, is used in the transition area between the cut back trailing edge 28 and the platform 30. By using this compound radius blending approach, the formation of a cusp on the trailing edge is avoided.

Figure 5:
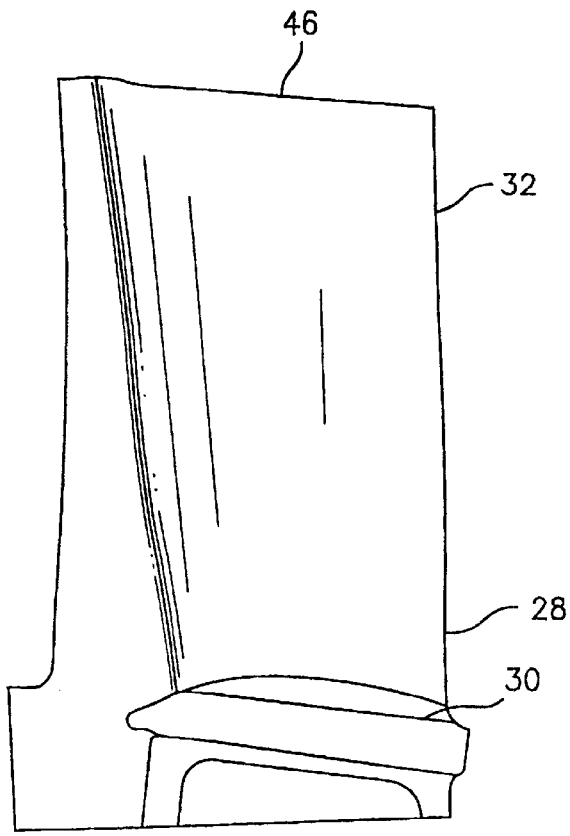
FIG. 5 is a side view of a turbine blade repaired in accordance with the present invention.
Figure 6:
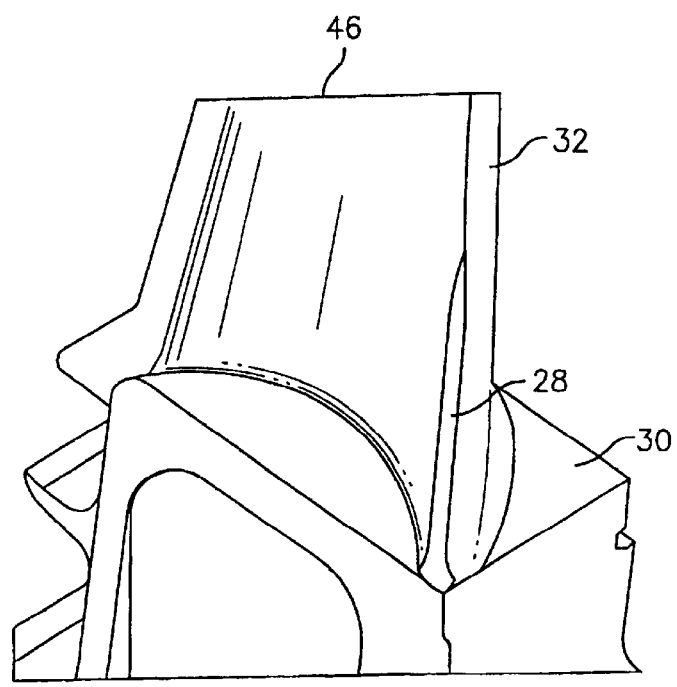
FIG. 6 is a perspective view of the turbine blade of FIG. 5.

When the concave and convex sides are cut back, they are not cut back along the entire span of the airfoil portion 22 of the turbine blade 10. Preferably, the top half 32 of the original trailing edge 12 is left alone. It is then necessary to fair the cut back trailing edge portion 28 into the original trailing edge profile to minimize aerodynamic impact. Any suitable technique known in the art which minimizes abrupt changes/discontinuities in the trailing edge geometry of the turbine blade 10 and which avoids adverse effects on the flow field, vibrations, and structural integrity may be used to fair the cut back trailing edge portion 28 into the original trailing edge profile. As shown in FIGS. 5 and 6, preferably, the cut back trailing edge portion 28 is faired into the original trailing edge profile at approximately about the 50% span.

Figure 7:
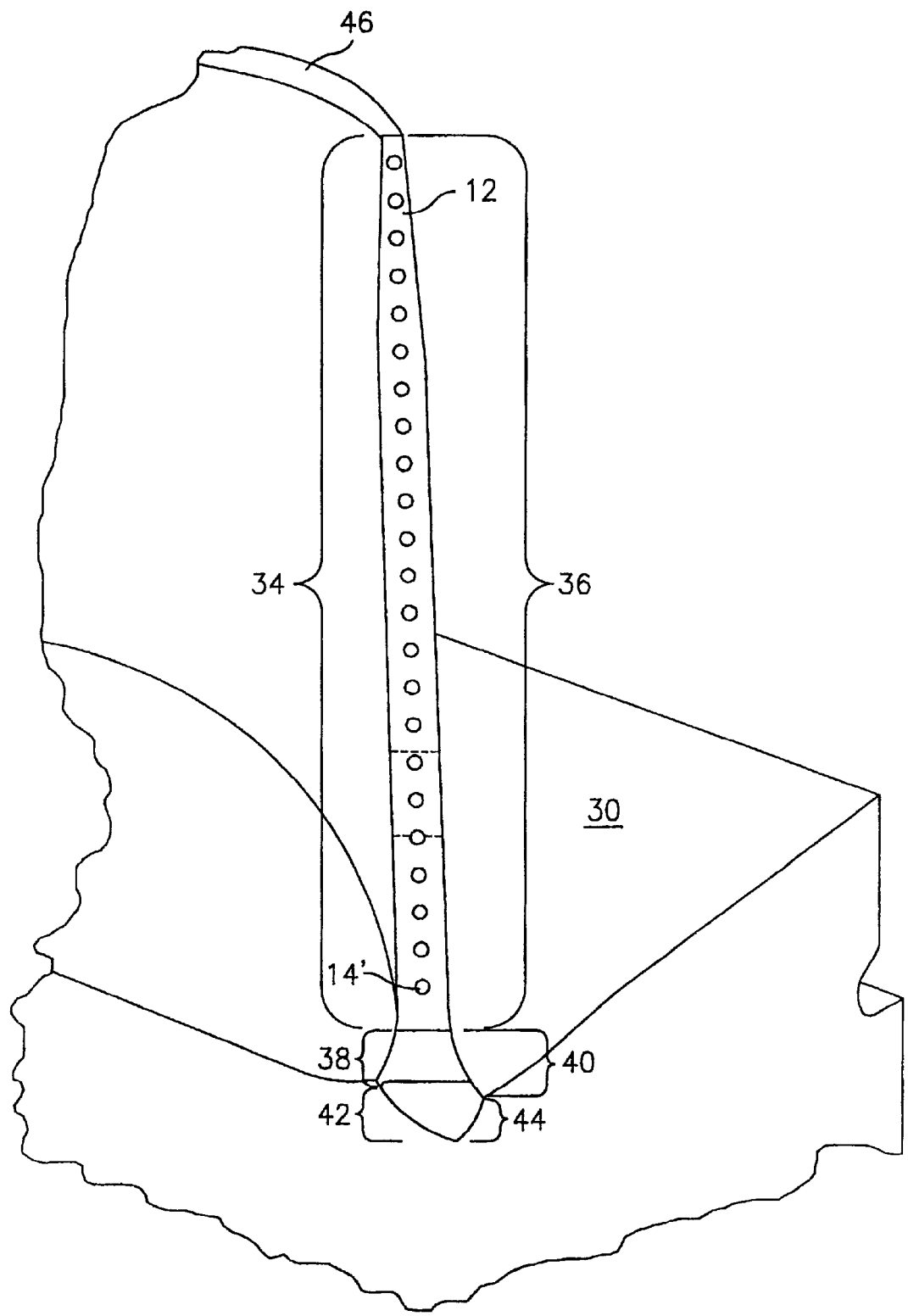
FIG. 7 is a rear view of the turbine blade of FIG. 5.

After the cut back, platform blending, and trailing edge fairing steps have been completed to a desired depth, any remaining edges are blended, either by machine or by hand, to a smooth radius to minimize stress concentration and aerodynamic losses. The edges 34, 36, 38, 40, 42, and/or 44 which typically require the blending are shown in FIG. 7. In a preferred embodiment of the repair method of the present invention, the edges 34, 36, 38, 40, 42, and/or 44 are blended to a smooth radius of approximately about 0.005 to approximately about 0.015 inches.

If needed, the cooling holes 14 may be refurbished using any suitable technique known in the art.

It has been found that the service life of a turbine blade 10 repaired as above can be increased by approximately about 2× or more by applying a thermal barrier coating to the turbine blade 10. The thermal barrier coating may comprise any suitable thermal barrier coating known in the art and may be applied using any suitable means known in the art. For example, the thermal barrier coating may be a MCrAlY coating where M is selected from the group consisting of iron, nickel, cobalt, and mixtures of nickel and cobalt such as that shown in U.S. Pat. No. 4,321,311, which is hereby incorporated by reference herein. Alternatively, the thermal barrier coating may be a MCrAlY type coating where M is nickel or cobalt and which is improved by the addition of from 0.1 to 7.0% by weight silicon and 0.1 to 2.0% by weight hafnium such as that shown in U.S. Pat. No. 4,585,481, which is hereby incorporated by reference herein. The thermal barrier coating could also be a thermally insulating ceramic coating having a pyrochlore structure such as that shown in U.S. Pat. No. 6,117,560, which is hereby incorporated by reference herein. The thermal barrier coating could also be a thermally insulating ceramic coating containing gadolinia and zirconia such as that shown in U.S. Pat. No. 6,177,200, which is hereby incorporated by reference herein. The thermal barrier coating may be applied to the turbine blade using any of the techniques shown in the aforementioned U.S. Patents.

It has been found desirable to modify the tip portion 46 of the turbine blade 10 to increase its length prior to applying the thermally insulating ceramic coating to the turbine blade 10. This is to account for the reduced substrate temperatures which will be encountered by the turbine blade 10 as a result of the thermally insulating ceramic coating. The tip portion 46 is preferably modified by applying a weld material to the tip portion 46 and machining the turbine blade 10 to a predetermined length. While the weld material to be applied to the tip portion 46 may comprise any suitable welding or brazing material known in the art, it is preferred to add a nickel based alloy weld material to the tip portion 46. The added weld material helps avoid any negative clearance effects caused by the application of the thermally insulating ceramic coating. With the thermally insulating ceramic coating, the turbine blade 10 will not thermally expand as originally designed. The turbine blade 10 will expand less, as it is cooler. This in turn creates a larger gap at the tip portion 46 in the radial direction, than is desirable from a leakage/sealing standpoint and from a performance standpoint. Thus, to accommodate the reduced tip growth, the tip portion 46 is built up with weld material and then machined to a desired predetermined length.

One of the principal advantages to adding the thermal barrier coating to the repaired turbine blade 10 is that it reduces blade metal temperature gradients. The reduced thermal gradient combined with thicker trailing edge walls and increased fillet radius reduce airfoil root stresses and increases blade service life. In particular the thermal mechanical fatigue life, of the repaired blade is increased by 2 times or more.

Further, it is within the scope of this invention, and understood by those skilled in the art, that the method described herein may be utilized to repair a variety of blades thus advantageously providing a repaired blade with enhanced service life, as compared to that of the original blade.

It is apparent that there has been provided in accordance with the present invention a method for repairing trailing edge cracks in turbine blades which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. A method for repairing a turbine blade having a crack in a trailing edge portion of the blade, said method comprising the steps of:

cutting back a first surface of the turbine blade adjacent the blade trailing edge portion where said crack is located;

cutting back a second surface of the turbine blade adjacent the blade trailing edge portion where said crack is located; and each of said cutting back steps comprising cutting back said respective surface by a depth greater than the length of said crack and less than the trailing edge radius to remove said crack and form a cut back trailing edge portion.

2. A method according to claim 1, wherein each of said cutting back steps comprises cutting back said respective surface from a first point adjacent a root portion of said trailing edge portion to a second point at the approximate mid-span of the turbine blade.

3. A method according to claim 2, further comprising blending said cut back trailing edge portion into a portion of the original trailing edge portion.

4. A method according to claim 1, blending said cut back trailing portion into a platform portion of said turbine blade.

5. A method according to claim 4, wherein said blending step comprises using a compound radius to eliminate any cusp on the trailing edge of said turbine blade.

6. A method according to claim 4, further comprising blending remaining edges to a smooth radius to minimize stress concentrations.

7. A method according to claim 1, further comprising applying a thermal barrier coating to said turbine blade after said cutting back steps.

8. A method according to claim 7, further comprising modifying the tip length of the turbine blade prior to the thermal barrier coating applying step to account for reduced substrate temperatures.

9. A method according to claim 8, wherein said modifying step comprises applying weld material to a tip portion of said turbine blade prior to said thermal barrier coating applying step and machining said turbine blade to a predetermined length.

10. A method according to claim 9, wherein said weld material applying step comprises applying a nickel base alloy welding material to said tip portion.

11. A method according to claim 7, wherein said thermal barrier coating step comprises applying a thermally insulating ceramic coating.

12. A method according to claim 7, wherein said thermal barrier coating applying step comprises applying a MCrAlY coating where M is selected from the group consisting of iron, nickel, cobalt and mixtures of nickel and cobalt.

13. A method according to claim 7, wherein said thermal barrier coating applying step comprises applying a MCrAlY coating where M is nickel or cobalt and which contains silicon and hafnium.

14. A method according to claim 7, wherein said thermal barrier coating applying step comprises applying a thermally insulating ceramic coating.

15. A method according to claim 14, wherein said thermally insulating ceramic coating has a cubic pyrochlore structure.

16. A method according to claim 7, wherein said thermal barrier coating applying step comprises applying a ceramic thermal barrier coating composed of gadolina and zirconia.

* * * * *